(12) United States Patent
Shimizu et al.

(10) Patent No.: US 8,238,273 B2
(45) Date of Patent: Aug. 7, 2012

(54) COMMUNICATION SYSTEM, COMMUNICATION METHOD, TRANSMITTER, AND RECEIVER

(75) Inventors: Masahiko Shimizu, Kawasaki (JP); Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 995 days.

(21) Appl. No.: 11/826,608

(22) Filed: Jul. 17, 2007

(65) Prior Publication Data
US 2008/0019348 A1 Jan. 24, 2008

(30) Foreign Application Priority Data
Jul. 21, 2006 (JP) .................................. 2006-199775

(51) Int. Cl.
H04B 7/00 (2006.01)
(52) U.S. Cl. ........................................ 370/310; 370/319
(58) Field of Classification Search .................. 370/310, 370/319, 320, 321, 342–347, 480–490, 498, 370/499
See application file for complete search history.

(56) References Cited

U.S. PATENT DOCUMENTS

| 7,590,200 | B2* | 9/2009 | Fujii et al. | 375/347 |
| 7,616,698 | B2* | 11/2009 | Sun et al. | 375/267 |
| 7,715,497 | B2 | 5/2010 | Miyoshi | |
| 7,778,309 | B2* | 8/2010 | Jung et al. | 375/148 |
| 7,826,557 | B2 | 11/2010 | Li et al. | |
| 7,953,428 | B2 | 5/2011 | Shimizu et al. | |
| 2003/0174767 | A1* | 9/2003 | Fujii et al. | 375/229 |
| 2004/0213184 | A1* | 10/2004 | Hu et al. | 370/335 |
| 2007/0255993 | A1 | 11/2007 | Yap et al. | |
| 2008/0123583 | A1 | 5/2008 | Shiizaki et al. | |

FOREIGN PATENT DOCUMENTS

| JP | 6-252971 | 9/1994 |
| JP | 2004-289353 | 10/2004 |
| JP | 2005-277570 | 10/2005 |
| WO | WO-2005/109710 A1 | 11/2005 |
| WO | WO-2006/030478 A1 | 3/2006 |
| WO | WO-2006/064857 A1 | 6/2006 |
| WO | WO-2006/070465 A1 | 7/2006 |

OTHER PUBLICATIONS

Japanese Office Action mailed Jun. 14, 2011 for corresponding Japanese Application No. 2006-199775, with partial English-language translation.

* cited by examiner

*Primary Examiner* — Robert Scheibel
*Assistant Examiner* — Mark A Mais
(74) *Attorney, Agent, or Firm* — Fujitsu Patent Center

(57) ABSTRACT

The present method groups a transmission data stream, taking a combination of data bits to be transmitted from a part or all of the plurality of transmission antennas at the same time as one group; and performs transmission processing, including at least either of bit repetition processing or retransmission processing by the unit of the group (bit combination). As a result, in MIMO communication, etc., it is possible to suppress deterioration of reception characteristic due to vanishing of correlation among bits transmitted at the same time.

8 Claims, 18 Drawing Sheets

COMMUNICATION SYSTEM, COMMUNICATION METHOD, TRANSMITTER, AND RECEIVER

CROSS REFERENCE TO RELATED APPLICATION(S)

This application is based on and hereby claims priority to Japanese Application No. 2006-199775 filed on Jul. 21, 2006 in Japan, the contents of which are hereby incorporated by reference.

BACKGROUND OF THE INVENTION (1) Field of the Invention

The present invention relates to a communication system, a communication method, a transmitter, and a receiver. For example, the invention relates to technology suitable for radio communication technology by MIMO (Multiple-Input Multiple-Output) scheme.

(2) Description of the Related Art

Recently, MIMO becomes a focus of attention as technology making possible a great amount (high-speed) data communication by effectively using frequency bands. In MIMO, multiple antennas are provided at both of the transmission and reception ends, that is, individual data streams are transmitted from the multiple antennas of the transmitter and received by the multiple antennas of the receiver. From the signal received by each reception antenna of the receiver, multiple transmission signals (data streams) mixed on a propagation path are separated using propagation paths (channel) estimation values, so that a transmission rate is improved without necessity of enlargement of the frequency band.

FIG. 13 is a block diagram showing an example of a transmitter (MIMO transmitter) employing the MIMO communication scheme. For example, an important part of the transmitter includes: an error correction coding unit 101; a first rate matching unit 102 for each bit; a memory (retransmission data storing unit) 103; a second rate matching unit for each bit 104; a grouping unit 105 for each symbol; an antenna separator 106; and modulators 107, each for a transmission antenna (not illustrated).

In the transmitter with such construction, transmission data is subjected to error correction coding by the error correction coding unit 101 and data amount adjusting (rate matching) processing, such as puncture (thinning out) processing and repetition (bit repetition) processing, by the first rate matching unit 102 by the unit of bit so that the data amount is made to be an amount which can be stored in a predetermined area of the memory 103, and is then stored in the memory 103 in preparation for retransmission control such as HARQ (Hybrid Automatic Repeat reQuest). In this instance, the memory 103 is not necessary in such systems as those which do not perform retransmission control.

Data (including retransmission data) read from the memory 103 is then subjected to rate matching processing similar to the above by the second rate matching unit 104 by the unit of bit so that the data has a data amount which can be accommodated in a predetermined transmission frame. After that, the data is grouped for each symbol to be mapped corresponding to the modulation scheme (QPSK or 16QAM, etc.), and is then input to each modulator 107 through the antenna separator 106.

Each of the modulators 107 modulates the input data with a predetermined modulation scheme, and outputs the modulated data to the corresponding antennas (transmission antennas #1 and #2). With this arrangement, the modulated data is radiated from the transmission antenna #1 and #2 to air toward a receiver (not illustrated).

That is, in the transmitter of FIG. 13, the antenna separator 106 divides a symbol into transmission antennas #1 and #2 immediately before transmission.

In this case, no limitation (regulation) exists in the combination of repetition bits and retransmission bits at the time of the repetition processing and retransmission control with bits transmitted at the same time. Thus, as schematically shown in FIG. 15, for example, the repetition bit or the retransmission bit (b1) is transmitted from the transmission antennas #1 and #2 at the same time in combination with different bits (b2 and b3) at time T1 and time T2. More precisely, in FIG. 15, repetition bit or retransmission bit b1 is simultaneously transmitted with bit b2 at time T1, and with bit b3 at later time T2. In this instance, bi (i=1, 2, . . . ) takes a value of 1 or −1.

The same holds true for the MIMO transmitter which controls transmission rate for each transmission stream, that is, as shown in FIG. 14, for example, in the case of controlling transmission rate based on propagation quality about transmission antennas (for example, feedback signal from a receiver such as CQ1) individually for each transmission block, by providing the transmission block for each transmission stream, which transmission block includes the error correction coding unit 101, the first rate matching unit 102 for each bit, the memory (retransmission data storing unit) 103, the second rate matching unit 104 for each bit, the grouping unit 105 for each symbol, and the modulators 107 for each of the transmission antennas #1 and #2. That is, similar to the transmitter of FIG. 13, no limitation (regulation) exists in combinations of repetition bits and retransmission bits in repetition processing and retransmission control. Thus, as shown in FIG. 15, the repetition bit or the transmission bit (b1) is transmitted from the transmission antennas #1 and #2 at the same time in combination with different bits (b2 and b3) at time T1 and time T2.

In this manner, when a bit simultaneously transmitted with a repetition bit and a retransmission bit at the same time is transmitted in different bit combination at different time, the receiver separates a signal transmitted at the same time, as described above, into each bit, and performs repetition combination processing and retransmission combination processing.

For example, as schematically shown in FIG. 16, assuming that the propagation coefficient between the transmission antenna #1 and the reception antenna is $\alpha$, the propagation coefficient between the transmission antenna #2 and the reception antenna is $\beta$, and that, at time T1, bit b1 is transmitted from the transmission antenna #1 and bit b2 is transmitted from the transmission antenna #2, the reception antenna receives $\alpha \times b1 + \beta \times b2$ as a reception signal. Then, at time T2, afterward, assuming that bit b3 is transmitted from the transmission antenna #1 and repetition (or retransmission) bit b1 is transmitted from the transmission antenna #2, the above-described reception antenna receives $\alpha \times b3 + \beta \times b1$ as a reception signal.

In this case, as shown in FIG. 17, on the receiver, bit b1 is separated and extracted from the reception signal $\alpha \times b1 + \beta \times b2$ received at time T1, and bit b1 is separated and extracted from the reception signal $\alpha \times b3 + \beta \times b1$ received at time T2, and combination processing is then performed.

In this instance, the following patent documents 1 and 2 disclose a technique in which interleave, repetition, etc., are performed by the unit of symbol in the transmitter having a single transmission antenna. In the techniques in both the patent documents 1 and 2, it is made to be possible to perform soft decision Viterbi coding even when convolution code of an arbitrary coding ratio is transferred in any multiple value modulation scheme, so that an error rate is lowered.

For this purpose, in the techniques of patent documents 1 and 2, on the transmitter end, input information series is subjected to convolution coding by a convolution coder, and is then mapped into a multiple value modulation symbol. A sub-symbol-interleaver performs interleave by the unit of sub-symbol, and orthogonal modulation is performed before transmission. On the receiver end, the received data is subjected to synchronous detection, and a sub-symbol-deinterleaver performs deinterleave by the unit of sub-symbol with amplitude data. Then, the soft decision Viterbi decoder organizes the state transition corresponding to multiple code words using the least common multiple between the number of bits of code words and the number of bits of sub-symbols as the number of processing unit bits, and perform soft decision Viterbi decoding using the amplitude information of sub-symbols. Hereby, soft decision Viterbi decoding becomes possible by selecting an appropriate combination of the coding ratio of convolution codes and symbols of multiple value modulation, so that the transmission error ratio can be reduced as much as possible.

[Patent Document 1] Japanese Patent Application Laid-open No. HEI 6-252971

[Patent Document 2] Japanese Patent Application Laid-open No. 2004-289353

However, when an attempt is performed for separating and extracting bit b1 from the received signals received at different times as already described with reference to FIG. 17 for combination, correlation among bits is vanished by the separation, and reception characteristic is deteriorated.

More precisely, a shown in FIG. 18, a signal transmitted at time T1 is a combination of bit b1 and bit b2, and a signal transmitted at time T2 is a combination of bit b1 and bit b3, and each bit takes a value of 1 or −1. When the propagation coefficient $\alpha=\beta=1$, the received signal b1+b2 is "0". Assuming that noise does not exists, a signal transmitted at time T1 does not take a combination of (b1, b2)=(1, 1) or (−1, −1), and the probabilities of (b1, b2)=(−1, 1) and (b1, b2)=(1, −1) are 0.5, respectively.

Accordingly, when bit b1 is extracted from this signal, the probabilities of 1 and −1 are the same value, 0.5, and thus information about combination (correlation information between bits) is vanished, and thus, separation and extraction of bit b1 becomes erroneous. The same holds true for signals (b1 and b3) transmitted at time T2. As a result, it is impossible to perform combination of bit b1 correctly, so that reception characteristic is deteriorated.

SUMMARY OF THE INVENTION

With the foregoing problems in view, it is an object of the present invention to make it possible to suppress deterioration of reception characteristic due to vanishing of correlation information among bits as described above.

In order to accomplish the above object, the present invention is characterize in providing the communication system, the communication method, the transmitter, and the receiver as follows.

(1) As a generic feature, there is provided a communication system, comprising: a transmitter, including: a plurality of transmission antennas; simultaneous transmission bit grouping means which groups a transmission data stream, taking a combination of data bits to be transmitted from a part or all of the plurality of transmission antennas at the same time as one group; and transmission processing means which performs transmission processing, including at least either of bit repetition processing or retransmission processing, for a bit combination grouped by the simultaneous transmission bit grouping means; and a receiver, including: a plurality of reception antennas which receive a signal sent from the transmission antenna of the transmitter; likelihood calculating means which calculates likelihood with respect to a reception signal received by the reception antennas for each of the groups; and reception processing means which performs reception processing, including at least either of bit repetition combination processing or retransmission combination processing, for each of the groups, by means of combining likelihood calculated by the likelihood calculating means.

(2) As another generic feature, there is provided a communication method for use in a communication system including a transmitter having a plurality of transmission antennas and a receiver having a plurality of reception antennas, the method comprising: on the transmitter, grouping a transmission data stream, taking a combination of data bits to be transmitted from a part or all of the plurality of transmission antennas at the same time as one group; and performing transmission processing, including at least either of bit repetition processing or retransmission processing, for each of the grouped bit combinations, and on the receiver, obtaining likelihood with respect to a reception signal received by the reception antennas for each of the groups; and performing reception processing, including at least either of bit repetition combination processing or retransmission combination processing for each of the groups, by means of combining the obtained likelihood.

(3) As a preferred feature, the transmitter, comprising: a plurality of transmission antennas; simultaneous transmission bit grouping means which groups a transmission data stream, taking a combination of data bits to be transmitted from a part or all of the plurality of transmission antennas at the same time as one group; and transmission processing means which performs transmission processing, including at least either of bit repetition processing or retransmission processing, for a bit combination grouped by the simultaneous transmission bit grouping means.

(4) As another preferred feature, the simultaneous transmission bit grouping means groups a bit set corresponding to the level of reliability in a symbol as the group, when the symbol is transmitted by multiple bits of the transmission data stream.

(5) As yet another generic feature, there is provided a receiver which receives a signal sent from a transmitter that groups a transmission data stream, taking a combination of data bits to be transmitted from a part or all of the plurality of transmission antennas at the same time as one group and performs transmission processing, including at least either of bit repetition processing or retransmission processing, for each of the grouped bit combinations, the receiver comprising: a plurality of reception antennas which receives the signal; likelihood calculating means which calculates likelihood with respect to a reception signal received by the reception antennas for each of the groups; and reception processing means which performs reception processing, including at least either of bit repetition combination processing or retransmission combination processing, for each of the groups, by means of combining likelihood calculated by the likelihood calculating means.

According to the above-described invention, at least either of the following effects and benefits can be obtained.

(1) On the transmitter end, a combination (group) of bits simultaneously transmitted at bit repetition for rate matching and retransmission can be made to be the same as a combination of bits having already been simultaneously transmitted. Thus, on the receiver end, reception processing (likelihood combination) is performed by the unit of the group, so that vanishing of correlation among bits in the case where a combination of bits simultaneously transmitted is arbitrary and each bit is extracted and combined is avoided. Accordingly, it is possible to prevent deterioration of reception characteristic.

(2) Further, if a bit set corresponding to the level of reliability of a symbol at the time when the symbol is transmitted with multiple bits of a transmission data stream, is grouped as the above-mentioned group, likelihood calculation can be performed individually for groups using bit addition processing. Thus, the operation amount for likelihood calculation on the receiver end can be reduced, so that the speed of processing can be increased.

The above and other objects and features of the present invention will be understood by reading carefully the following description with accompanying drawings. Preferred embodiments of the preset invention will be described in more detail referring to the accompanying drawings. The drawings are illustrative and are not to be limitative of the scope of the present invention.

DESCRIPTION OF THE PREFERRED EMBODIMENT(S)

Preferred embodiments of the present invention are described in more detail below referring to the accompanying drawings.

Here, the present invention should by no means be limited to the embodiment described below, and various changes or modifications may be suggested without departing from the gist of the invention.

[A] Description of Overview

Figure 1:
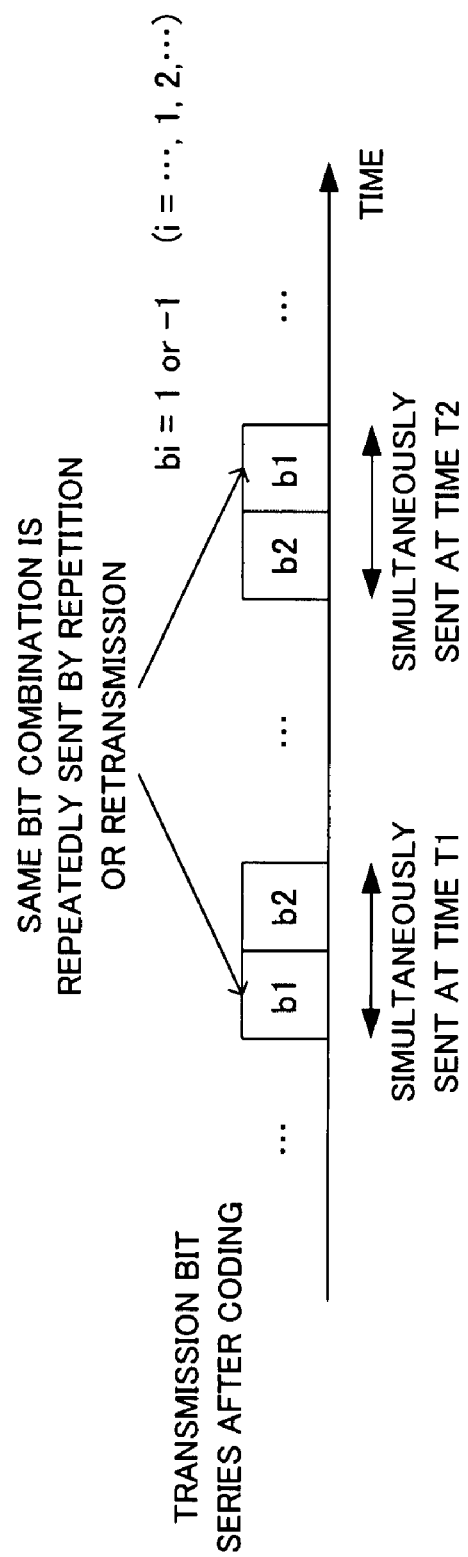
FIG. 1 is a schematic diagram showing an example of bit combinations simultaneously transmitted at different time for describing the overview of the present invention.

In order to resolve the above described issue, vanishing of correlation information between bits, a combination (group) of bits simultaneously transmitted at the time of repetition (bit repetition) or retransmission is made to be the same as a combination of bits having already been simultaneously transmitted. Then, at the receiver end, combination should be performed by this unit. As schematically shown in FIG. 1, when the combination (group) of bits simultaneously transmitted at time T1 is (b1, b2), the combination of bits with respect to bit b1 to be simultaneously transmitted at the time of repetition or retransmission (time T2) afterward is made to be the same combination (b1, b2). Then, at the receiver end, combination is performed by the above-mentioned combination (group) unit. In this instance, the same holds true for when the number of bits simultaneously transmitted is three or more, and bit bi (i=1, 2, 3, . . . ) takes a value of 1 or −1 (or 1 or 0).

Hereinafter, a description will be made of examples of MIMO transmitter and a MIMO receiver for realizing the above-described grouping transmission and combination processing by such transmission time unit.

[B] Description of One Preferred Embodiment (B1) Description of Transmitter

Figure 2:
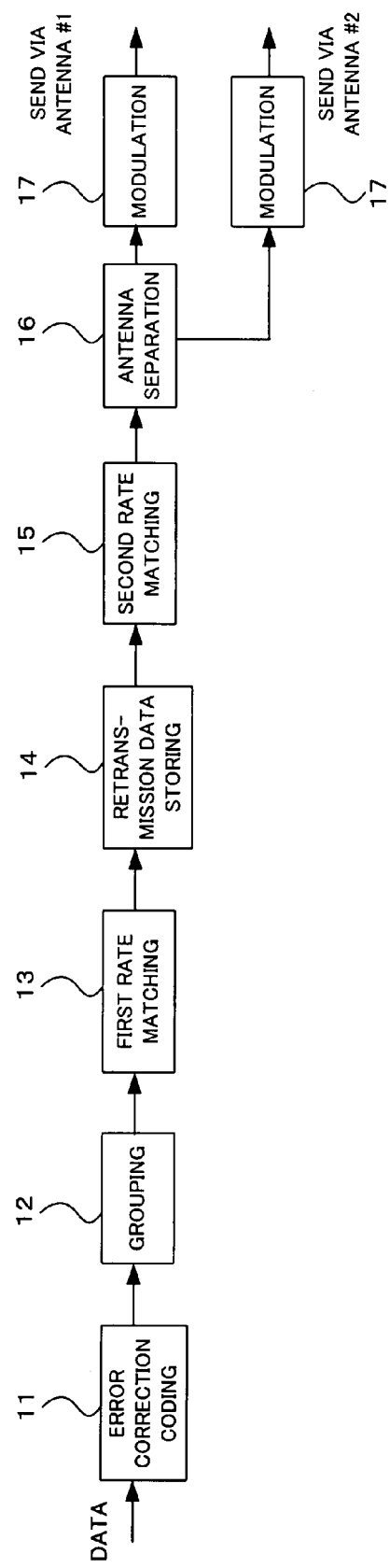
FIG. 2 is a block diagram showing an important part of a MIMO transmitter according to one preferred embodiment of the present invention.

FIG. 2 is a block diagram showing a construction of an important part of a MIMO transmitter according to one preferred embodiment of the present invention. The MIMO transmitter (hereinafter also simply called the "transmitter") has an error correction coding unit 11, a grouping unit 12, a first rate matching unit 13, a memory (retransmission data storing unit) 14, a second rate matching unit 15, an antenna separator 16, modulators 17 for multiple transmission antennas. In this instance, in the present example, it is assumed that transmission antennas are transmission antennas #1 through #N (N is an integer 2 or greater), and in FIG. 1, only two transmission antennas #1 and #2 are illustrated.

Here, the error correction coding unit 11 performs error correction coding of data (transmission stream) to be transmitted by turbo codes or convolution codes. The grouping unit (simultaneous transmission bit grouping means) 12 divides bit series coded by the error correction coding unit 11 along the transmission antennas #j (j=1 through N), and then groups the bit series by the unit of the number n (>2) of data bits to be transmitted at the same time. For example, n parallel data bits obtained by 1:n serial to parallel (S/P) conversion of input coding bit series are one group. In this instance, grouping of data bits to be simultaneously transmitted can be realized by the similar S/P conversion in the following embodiments.

The first rate matching unit 13 performs rate matching processing such as puncture and repetition on the coded bit series from the grouping unit 12, thereby performing data amount adjustment so that the coded bit series has a data amount which can be stored in a predetermined memory area of the memory 14. In the present example, the first rate matching unit 13 evenly performs puncture or repetition of the same number of bits onto the above-mentioned n parallel data, thereby executing rate matching processing by the unit of the above-mentioned group.

The memory 14 stores the coded bit series (n parallel data) after being subjected to the above-described rate matching in its predetermined memory area in preparation of retransmission based on HARQ, etc. Accordingly, the memory 14 stores the coded bit series by the above-mentioned group unit (as n parallel data). Reading of the coded bit series, including reading at the time of retransmission, is performed by the above-mentioned group unit.

The second rate matching unit 15 performs rate matching such as puncture and repetition onto the coded bit series read out form the memory 14, thereby adjusting the data amount of the coded bit series into an amount which can be stored in a predetermined transmission frame format. In this case, also, like the first rate matching unit 13, the second rate matching unit 15 evenly performs puncture or repetition of the same number of bits onto the above-mentioned n parallel data, thereby executing rate matching processing by the unit of the above-mentioned group.

In this instance, when interleaving the coded bit series (for example, after rate matching by the second rate matching unit 15), the interleave is also performed by the unit of the above-mentioned group.

The antenna separator 16 separates and divides the transmission bit series (n parallel data) after being subjected to rate matching processing by the second rate matching unit 15 into predetermined modulators 17. In case of the example of FIG. 1 (n=2), for example, at time T1, one of the two parallel data piece (bit b1) is input to the modulator 17 corresponding to the transmission antenna #1, and the other of parallel data piece (bit b2) is input to the modulator 17 corresponding to the transmission antenna #2. Here, since it is sufficient that the bit series of the same group is transmitted at the same time, the method of division (from which transmission antenna #j bit series should be transmitted) is arbitrary. That is, bits transmitted at the same time can be transmitted from different transmission antennas #j separately, or a part or all of the bits can be transmitted from the same transmission antenna #j.

The modulators 17 modulates transmission bit series input form the antenna separator 16 with a predetermined modulation scheme (for example, multiple value modulation scheme such as QPSK or 16QAM). The transmission bit series after modulation is subjected to required radio transmission processing such as D/A conversion or frequency conversion (up conversion) to a radio frequency (RF) signal, and then is finally radiated to air from the corresponding transmission antenna #j.

That is, the block composed of both the rate matching unit 13 and 15, the memory 14, the antenna separator 16, and the modulators 17 functions as a transmission processing means which performs transmission processing, including rate matching (repetition) and retransmission, and, in some case, interleave processing, by the unit of bit combination grouped by the grouping unit 12.

With such arrangement, in the MIMO transmitter of the present example, data to be transmitted is subjected to error correction coding with turbo codes or convolution codes by the error correction coding unit 11. After that, the coded data is grouped into combinations of bits to be transmitted at the same time by the grouping unit 12. Then, by using the bit group as a unit, rate matching (interleave if interleave should be performed) by the first and the second rate matching units 13 and 15 and storing and reading of data for retransmission to/from the memory 14 are performed.

After that, the coded bit series which has been subjected to rate matching suitable for a transmission frame format by the second rate matching unit 15 is divided into the modulators 17 corresponding to the predetermined transmission antennas #j by the antenna separator 16 to be subjected to modulation by QPSK or 16QAM, and then simultaneously transmitted from the transmission antennas #j by the unit of the above mentioned group.

As a result, simultaneous transmission by the same bit combination at the time of repetition and retransmission, as described above with reference to FIG. 1, is realized. In this instance, although, in the above example, all the bits transmitted at the same time are grouped into one group, they can be grouped into multiple groups. In that case, also, in the similar manner to the above, rate matching or the like should be performed by the unit of the group.

(B2) Modified Example of Transmitter

Figure 3:
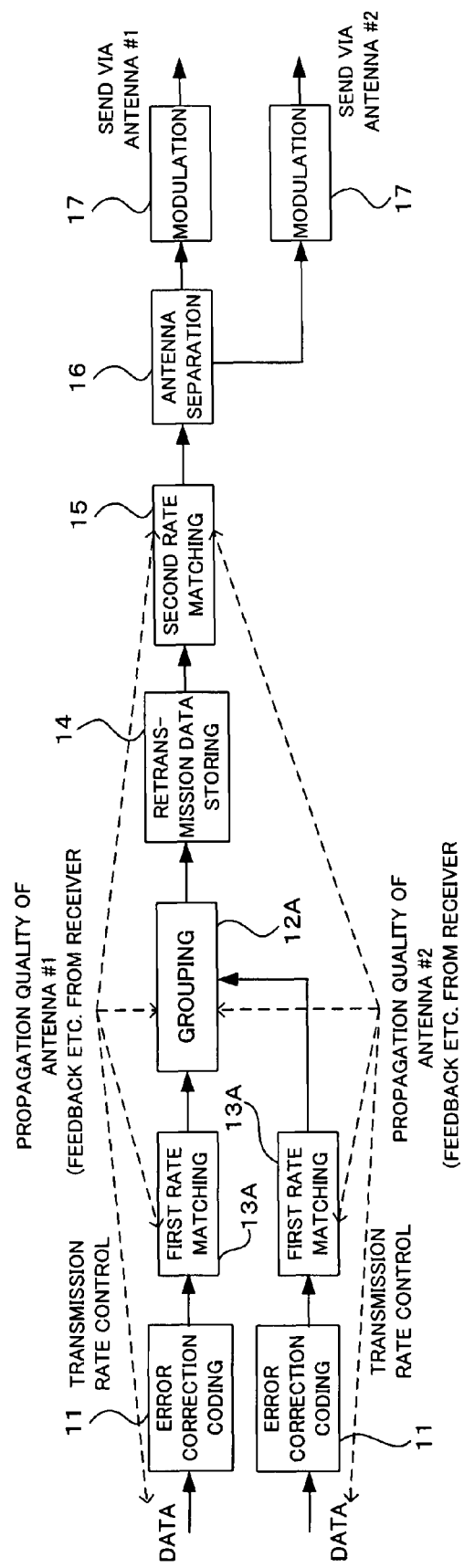
FIG. 3 is a block diagram showing a modified example of the MIMO transmitter of FIG. 2.

Next, FIG. 3 is a block diagram showing a construction of an important part of a MIMO transmitter in the cases where multiple transmission streams exist and transmission rate is controlled for each of the transmission data streams. The MIMO transmitter shown in FIG. 3 has an error correction coding unit 11 and a first rate matching unit 13A for each transmission stream, and has a grouping unit 12A, a memory (retransmission data storing unit) 14, a second rate matching unit 15, an antenna separator 16, and modulators 17 for transmission antennas #j.

Here, the error correction coding unit 11 performs error correction coding with turbo codes or convolution codes onto data series having the length (transport block size) corresponding to transmission rate of data (transmission stream) to be transmitted. In this instance, in the present example, although the error correction coding unit 11 is provided for each transmission stream, a common error correction coding unit 11 can also be provided for the data streams.

The first rate matching unit 13A performs rate matching processing such as puncture and repetition on the coded bit series from the corresponding error correction coding unit 11 by the unit of bit, thereby performing data amount adjustment so that the coded bit series has a data amount which can be stored in a predetermined memory area of the memory 14. In the present example, the first rate matching unit 13A performs rate matching processing so that the transmission rate of each transmission stream has an appropriate ratio.

The grouping unit (simultaneous transmission bit grouping means) 12A divides the coding bit series of each transmission stream, after being subjected to the above-mentioned rate matching, for each of the transmission antennas#j (j=1 through N), and then performs grouping by the unit of the number n of data bits to be transmitted at the same time. For example, n parallel data bits, obtained by 1:n serial to parallel conversion of input coded bit series of the whole of the transmission streams, become one group.

The memory 14, in the present example, also, stores coded bit series (n parallel data bits) after being subjected to the above-described grouping in the above-mentioned predetermined memory area by the unit of the above-mentioned group (as n parallel data bits). Reading of the coded bit series, including reading at the time of retransmission, is also performed by the unit of the group.

The second rate matching unit 15 performs rate matching processing, such as puncture and repetition, onto the coded bit series read out from the memory 14 by the unit of the group, thereby adjusting the data amount of the coded bit series into an data amount which can be accommodated in a predetermined transmission frame format. The rate matching processing by the unit of the group is performed by mean of evenly executing puncture or repetition of the same number of bits onto the n parallel data.

In this instance, when the coded bit series is interleaved (for example, after rate matching performed by the second rate matching unit 15), such interleave is performed also by the unit of the group.

Figure 4:
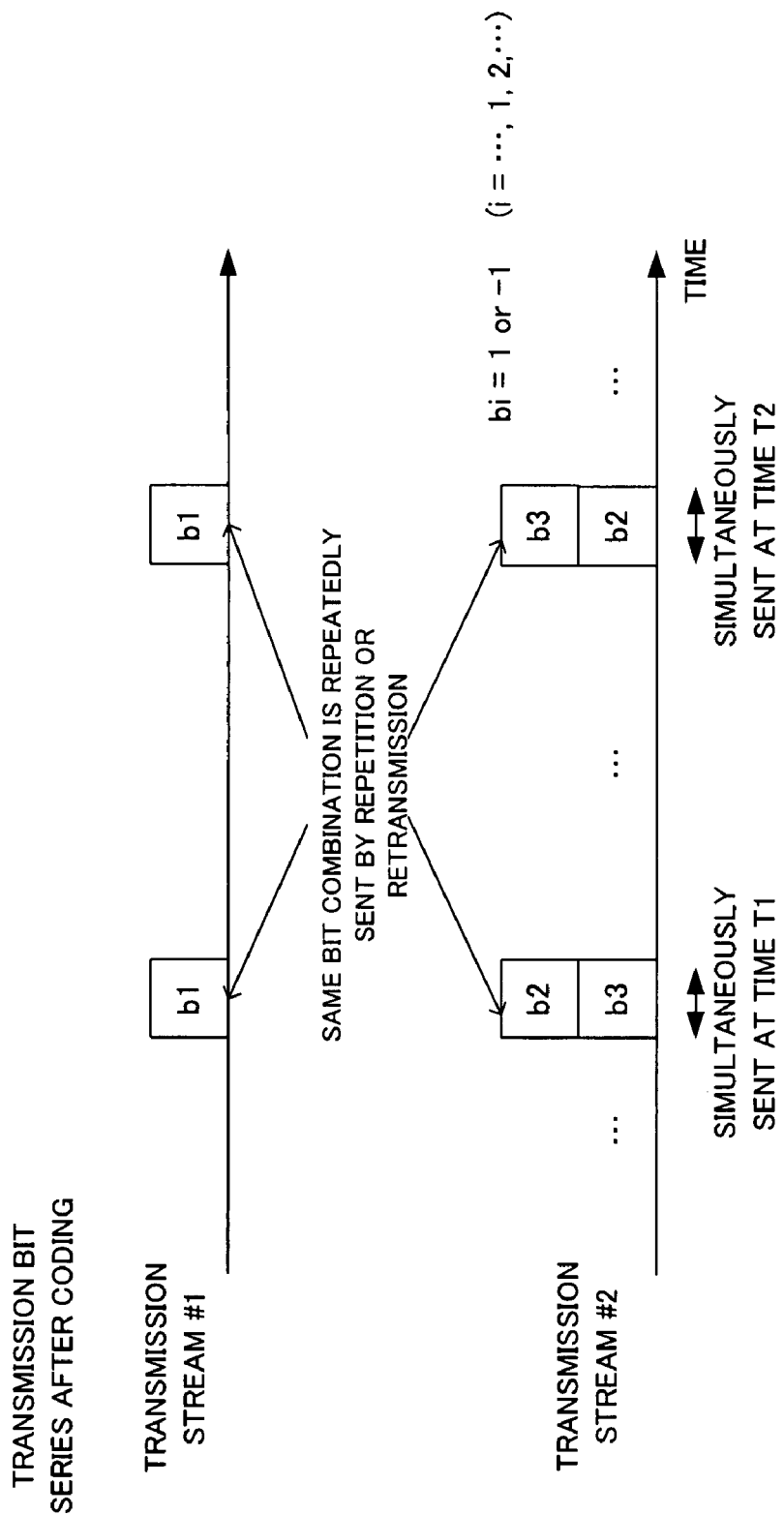
FIG. 4 is a schematic diagram showing an example of bit combinations simultaneously transmitted at different times for describing an operation of the MIMO transmitter of FIG. 2.

The antenna separator 16 separates and divides transmission bit series (n parallel data bits), after being subjected to rate matching processing by the second rate matching unit 15, into predetermined modulators 17. In the example of FIG. 4 (n=3), at time T1, a part (bit b1 of the transmission stream #1) of 3 parallel data bits is input to the modulator 17 corresponding to the transmission antenna #1, and the remaining parallel data bits (bits b2 and b3 of the transmission stream #2) are input to the modulator 17 corresponding to the transmission antenna #2. Here, in the present example, also, since it is sufficient that bit series of the same group is transmitted at the same time, the method of division (from which transmission antenna #j data should be transmitted) is arbitrary. That is, bits transmitted at the same time can be transmitted from different transmission antennas #j, or a part or all of the bits can be transmitted from the same antenna #j.

The modulators 17 are the same as or similar to that which has already been described.

That is, the block composed of the memory 14, the second rate matching unit 15, the antenna separator 16, and the modulators 17 functions as a transmission processing means which performs transmission processing, including rate matching (repetition), retransmission processing, and in some case, interleave processing, by the unit of bit combination grouped by the grouping unit 12A.

In this instance, the transmission rate of each of the transmission stream is individually controlled by means of controlling the transport block size, rate matching processing on the first rate matching unit 13A, grouping processing on the grouping unit 12A, data matching processing on the second rate matching unit 15, by a non-illustrated controlling unit based on propagation quality (for example, a feedback signal such as a CQI value from the receiver) of the transmission antenna #j.

With this arrangement, in the MIMO transmitter of the present example, data to be transmitted is subjected to, for each transmission stream, error correction coding with turbo codes and convolution codes by the error correction coding unit 11, and separate rate matching processing (puncture or repetition), which makes the transmission rate of each transmission stream into an appropriate ratio, by the first rate matching unit 13A. After that, the grouping unit 12A determines bit combinations (bit group) to be transmitted at the same time.

In the example of FIG. 4, for example, bits b1, b2, and b3 are determined as one group, and processing hereinafter is performed by the unit of the group. That is, storing and reading of data for retransmission to the memory 14 and rate matching (interleave when the interleave is performed) by the second rate matching unit 15 are performed by the unit of the group.

Then, coded bit series, after being subjected to rate matching by the unit of the group so that it is adapted to the transmission frame format by the second rate matching unit 15, is divided into the modulators 17 corresponding to the predetermined transmission antennas #j by the antenna separator 16. After being modulated by QPSK or 16QAM by the modulators 17, the coded bit series is then simultaneously transmitted from the transmission antennas #j by the unit of the group.

Such arrangement realizes simultaneous transmission by the same bit combination at the time of repetition or retransmission as shown in FIG. 4. In this instance, in the present example, also, although all the bits transmitted at the same time are grouped into one group, they can be grouped into multiple groups. In that case, also, rate matching, etc, is performed by the unit of the group.

(B3) Description of Receiver

As described above in item (B1) and (B2), when the transmitter groups bits transmitted at the same time, the receiver (MIMO receiver) obtains the probability [or logarithm (log) likelihood] for each of the groups (bit combination). Repetition combination and retransmission combination is performed with the product (or the sum of logarithm likelihood] of the probability of the groups, thereby suppressing deterioration of reception property due to vanishing of correlation information among bits, which is an issue of the previous art.

Figure 5:
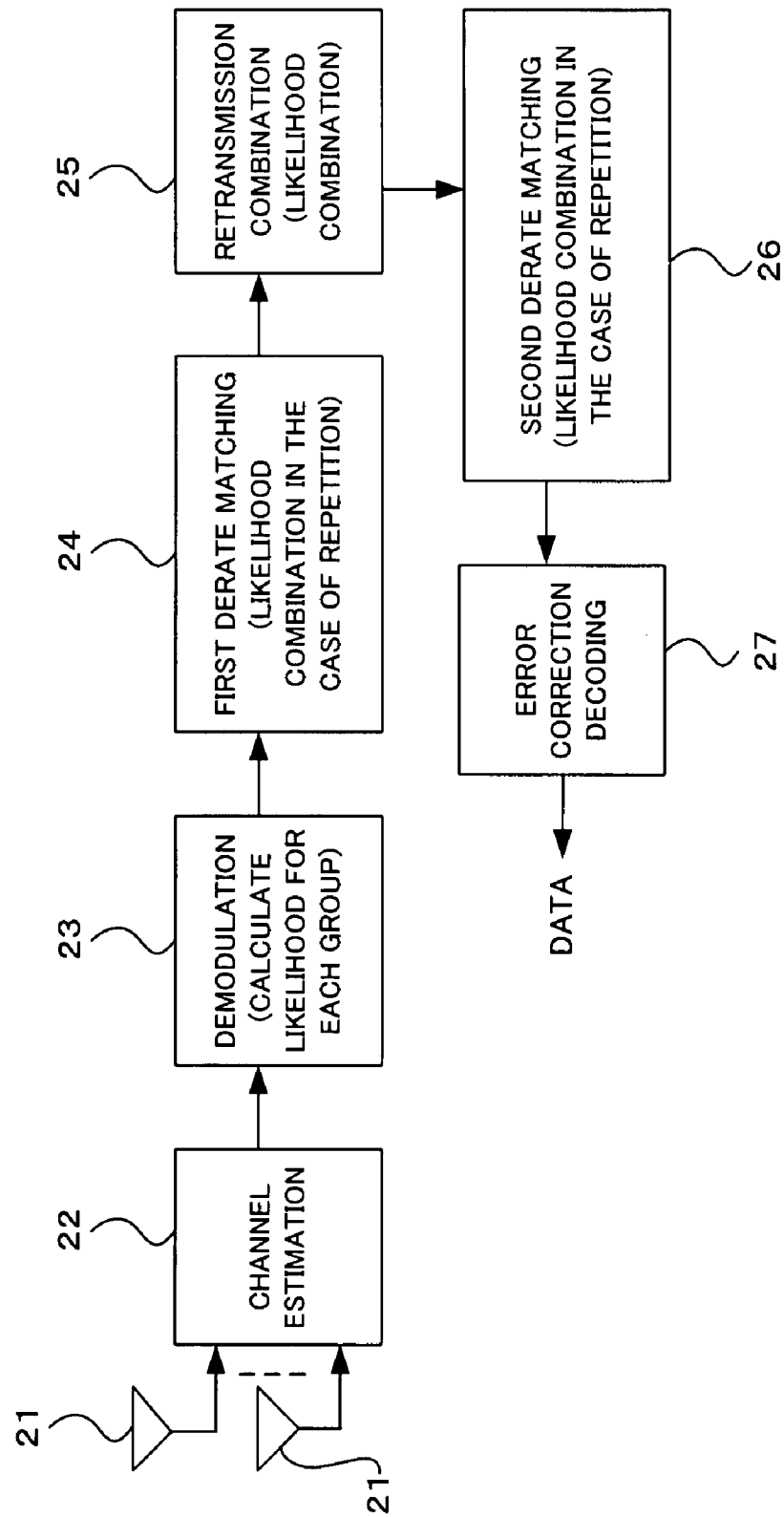
FIG. 5 is a block diagram showing an important part of a MIMO receiver according to one preferred embodiment of the present invention.

FIG. 5 is a block diagram showing a construction of an important part of a MIMO receiver according to the present embodiment. The MIMO receiver (hereinafter will be simply called the "receiver") of FIG. 5 has multiple reception antennas 21, a channel estimator 22, a demodulator 23, a first derate matching unit 24, a retransmission combiner 25, a second derate matching unit 26, and an error correction decoding unit 27.

Here, the reception antennas 21 receive signals transmitted from the transmitter already described with reference to FIG. 2 and FIG. 3. The channel estimator 22 estimates (that is, obtains channel estimation value) propagation path (channel) circumstances between the receiver and the transmitter by means of operating correlation between signals received by the reception antennas 21 and a replica of a pilot signal which is a known signal between the receiver and the transmitter. In this instance, in the present example, required radio reception processing including conversion (down conversion) of a received signal into a base band signal and conversion into a digital signal is omitted (the same holds true in the following).

The demodulator 23 compensates for (channel equalization) a received signal [data (transport) channel] based on the channel estimation value obtained by the channel estimator 22, and performs demodulation with the demodulation scheme corresponding to the modulation scheme (QPSK, 16QAM, etc.) on the transmitter end. In the present example, the demodulator 23 also functions as a likelihood calculator (likelihood calculation means) 231 (see FIG. 6) which calculates likelihood (probability) for each of the above-mentioned groups.

The first derate matching unit 24 performs processing (repetition or puncture) corresponding to the processing inverse of the rate matching processing performed by the second rate matching unit 15 on the transmitter 1 end onto the demodulated data obtained by the demodulator 23, thereby adjusting the data amount. In the case of the repetition, the probabilities of the groups are multiplied (or logarithm likelihoods are added).

The retransmission combiner 25 combines (retransmission combination) a signal, which is transmitted from the transmitter in response to a retransmission request to the transmitter based on HARQ, etc., with a signal which has already been received and stored. At the time, likelihoods of the above-mentioned groups are added.

The second derate matching unit 26 performs processing (repetition or puncture) corresponding to the processing inverse of the rate matching processing performed by the first rate matching unit 13 (or 13A) onto an output signal from the retransmission combiner 25, thereby adjusting the data amount. In this case, also, when repetition is performed, the probabilities of the groups are multiplied (or logarithm likelihoods are added).

That is, the block composed of the derate matching units 24 and 26 and the retransmission combiner 25 functions as a reception processing means which performs reception processing including repetition combination and retransmission combination (in some cases, deinterleave) by combining (probability multiplication or logarithm likelihood addition) likelihood obtained by the likelihood calculator 231.

The error correction decoding unit 27 performs error correction decoding of the received signal, after being subjected to data amount adjustment by the second derate matching unit 26, with the decoding scheme corresponding to the coding scheme used by the error correction coding unit 11 on the transmitter end, thereby restoring transmission data sent from the transmitter.

Figure 6:
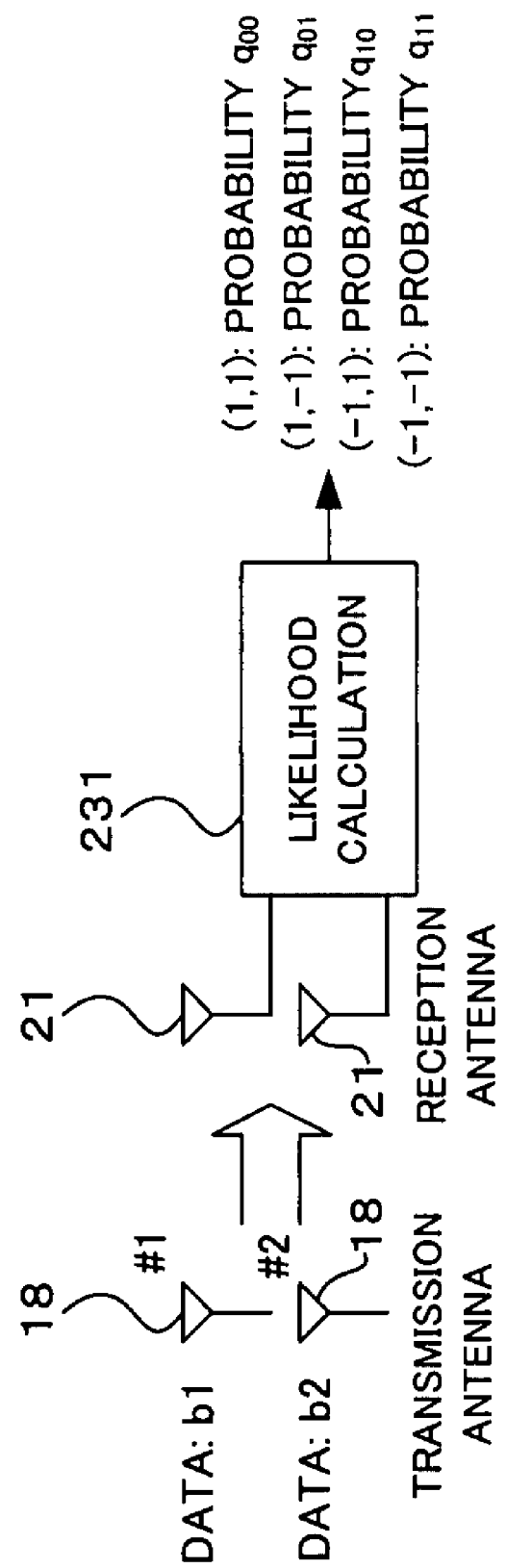
FIG. 6 is a schematic diagram showing a 2×2 MIMO communication system for describing an operation (likelihood calculation processing) of the MIMO receiver of FIG. 5.
Figure 7:
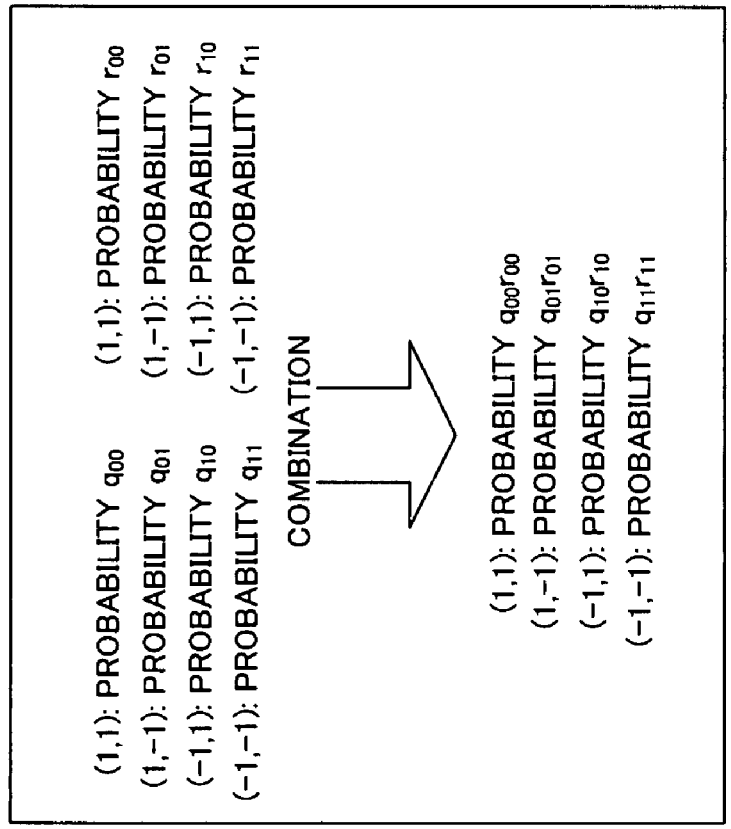
FIG. 7 is a diagram for describing likelihood calculation processing by the MIMO receiver of FIG. 5.

Hereinafter, referring to FIG. 6 and FIG. 7, a description will be made of an operation of the receiver of the present example with the above-described construction.

First of all, signals transmitted from the transmission antennas 18 (#j)(see FIG. 6) of the transmitter, which signals have been grouped in the above-described manner, are received by the reception antennas 21 of the receiver. After being subjected to required radio reception processing as described above, the signal is input to the channel estimator 22 in which the channel estimation value is obtained. On the basis of the channel estimation value, the demodulator 23 performs channel equalization and demodulation processing on the signal. At that time, as shown in FIG. 6, the likelihood calculator 231 calculates likelihood (probability) for each of the groups. That is, for example, if n(=2) bits are simultaneously transmitted from the transmitter, the combinations of the bits are $2^n = 2^2 = 4$, precisely, four types of $(1, 1), (1, -1), (-1, 1), (-1, -1)$. Thus, the probabilities of the bit combinations at a certain time are obtained as $q_{00}, q_{01}, q_{10}, q_{11}$ (hereinafter, simply described as "q" when they are not distinguished thereamong), and the probabilities at a different time are obtained as $r_{00}, r_{01}, r_{10}, r_{11}$ (likewise simply described as "r" when they are not distinguished thereamong).

After that, the first derate matching unit 24 performs puncture or repetition on the demodulated data, thereby adjusting the data amount. When repetition is performed, as schematically shown in FIG. 7, the probabilities $q_{00}, q_{01}, q_{10}, q_{11}$ and $r_{00}, r_{01}, r_{10}, r_{11}$ at different times are combined. That is, as combination probabilities, the productions of the probabilities $q_{00}r_{00}, q_{01}r_{01}, q_{10}r_{10}, q_{11}r_{11}$ are obtained.

The data after being subjected to data amount adjustment by the first derate matching unit 24, is then, if it is retransmission data in response to a retransmission request, retransmission-combined with the received data by the retransmission combiner 25. At that time, similar to the example of FIG. 7, $2^n$ types of combination probabilities qr are obtained. In this instance, if the received data is not retransmission data, the retransmission combination is not performed, and the data is output to the second derate matching unit 26.

Further, the second derate matching unit 26 performs puncture or repetition on the above output of the retransmission combiner 25, thereby adjusting the data amount. Here, when repetition is performed, similar to the example of FIG. 7, $2^n$ types of combination probabilities qr are obtained.

Then, the received data after being subjected to the data amount adjustment, is then subjected to error correction decoding by the error correction decoding unit 27, so that transmission data transmitted from the transmitter is restored.

Figure 8:
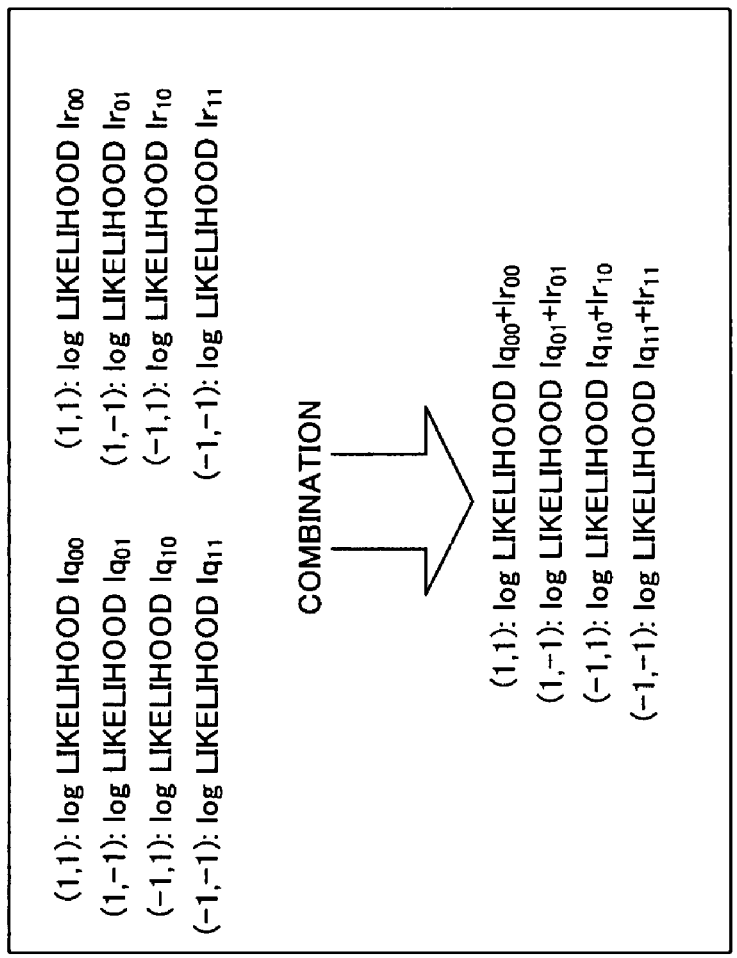
FIG. 8 is a diagram for describing a modified example of likelihood calculation processing by the MIMO receiver of FIG. 5.

In this instance, in the above example, the likelihood calculator 231 calculates probability for each group and performs combination. As schematically shown in FIG. 8, however, in the likelihood calculator 231, the logarithm likelihoods of bit combinations [(1, 1), (1, −1), (−1, 1), (−1, −1)] at a certain time can be given as $lq_{00}, lq_{01}, lq_{10}, lq_{11}$ (hereinafter, simply described as "lq" when they are not distinguished thereamong), and the logarithm likelihoods at a different time can be given as $lr_{00}, lr_{01}, lr_{10}, lr_{11}$. At the time of repetition on the first and second derate matching units 24 and 26 or retransmission on the retransmission combiner 25, such logarithm likelihoods lq and lr can be added (lq+lr), thereby realizing effects the same as those of the example of FIG. 7.

As described above, in the receiver according to the present embodiment, when repetition or retransmission is performed by the unit of the n bit group simultaneously transmitted, the probabilities or the logarithm likelihoods of taking bit combinations with respect to the received signal composed of n bits at difference reception times are obtained, and likelihood combination is performed by multiplication or addition of those, so that deterioration of reception characteristics due to vanishing of correlation among bits is suppressed.

Figure 12:
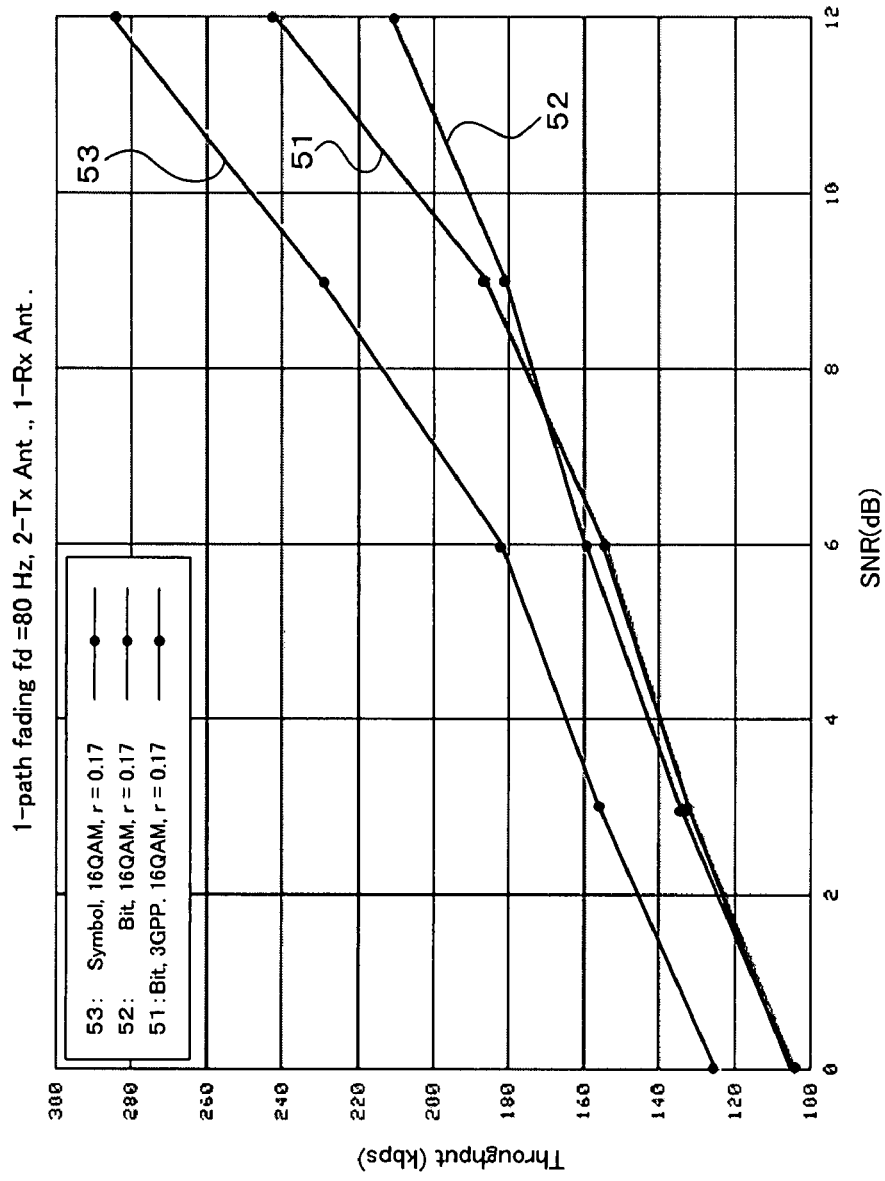
FIG. 12 is a graph showing a throughput characteristic of the present invention in comparison with that of the previous art.
Figure 13:
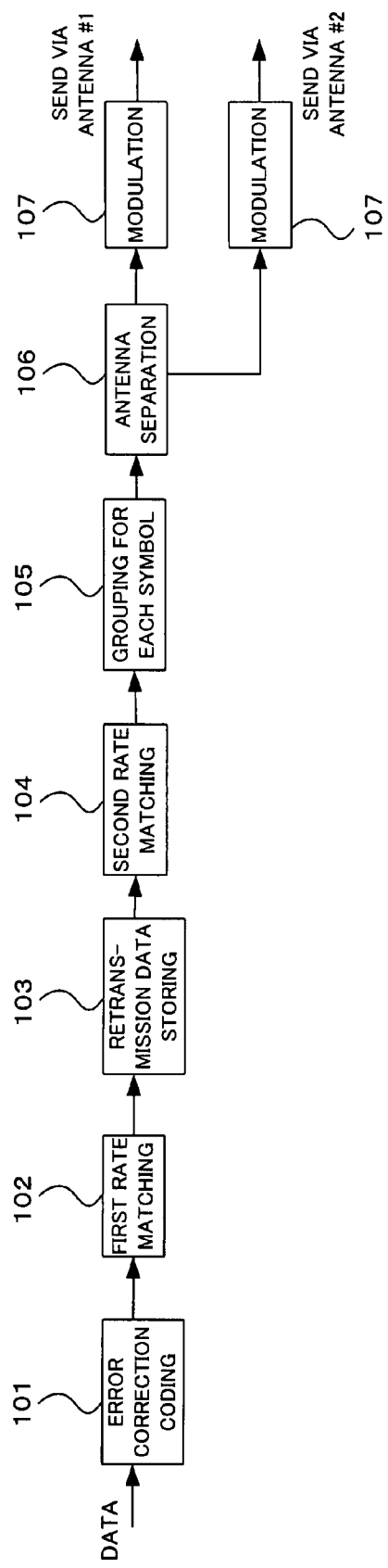
FIG. 13 is a block diagram showing an example of a transmitter (MIMO transmitter) employing the MIMO communication scheme.
Figure 14:
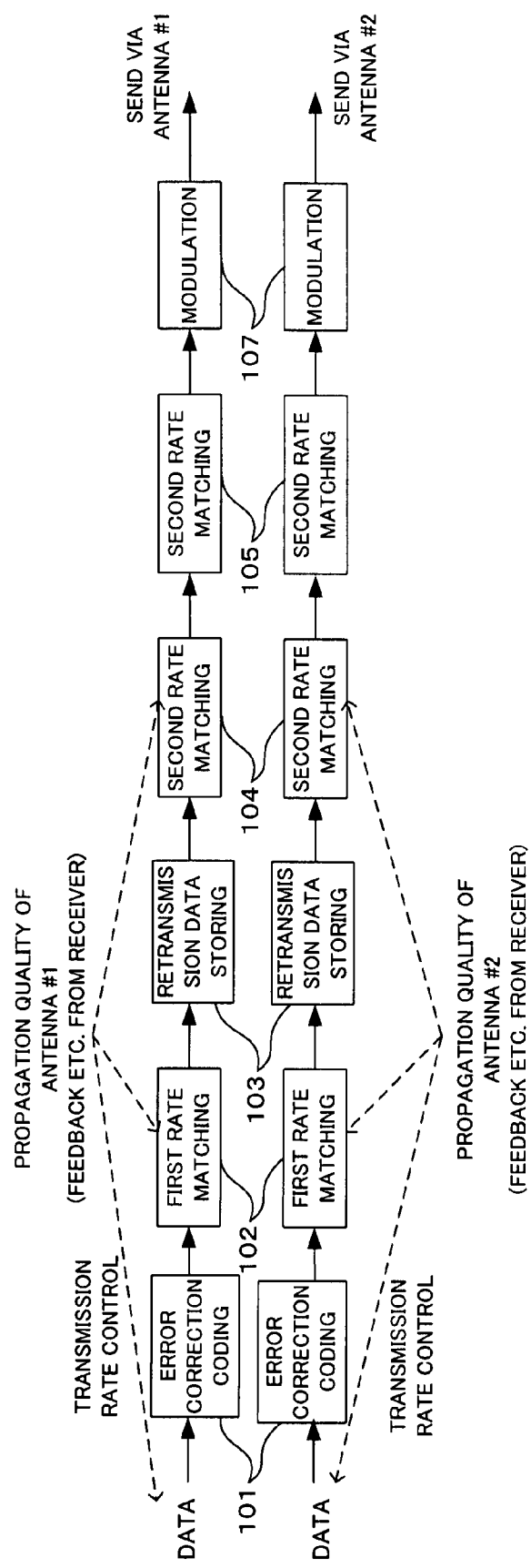
FIG. 14 is a block diagram showing another construction of a transmitter (MIMO transmitter) employing the MIMO communication scheme.
Figure 15:
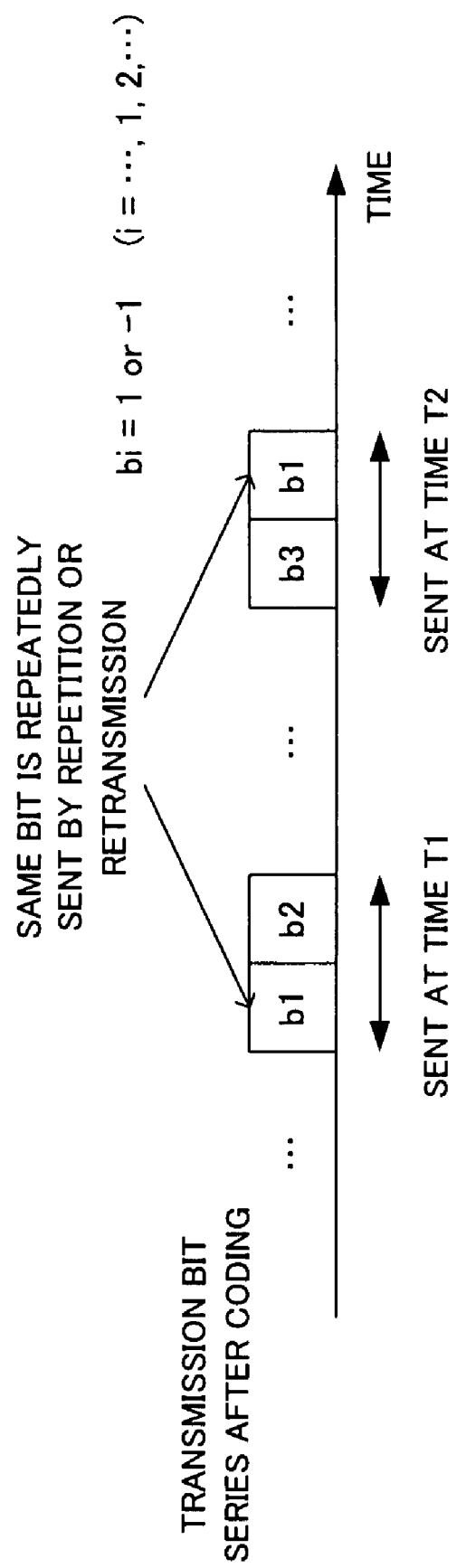
FIG. 15 is a schematic diagram showing an example of bit combinations simultaneously transmitted at different times for describing an operation of the MIMO transmitter of FIG. 13 or FIG. 14.
Figure 16:
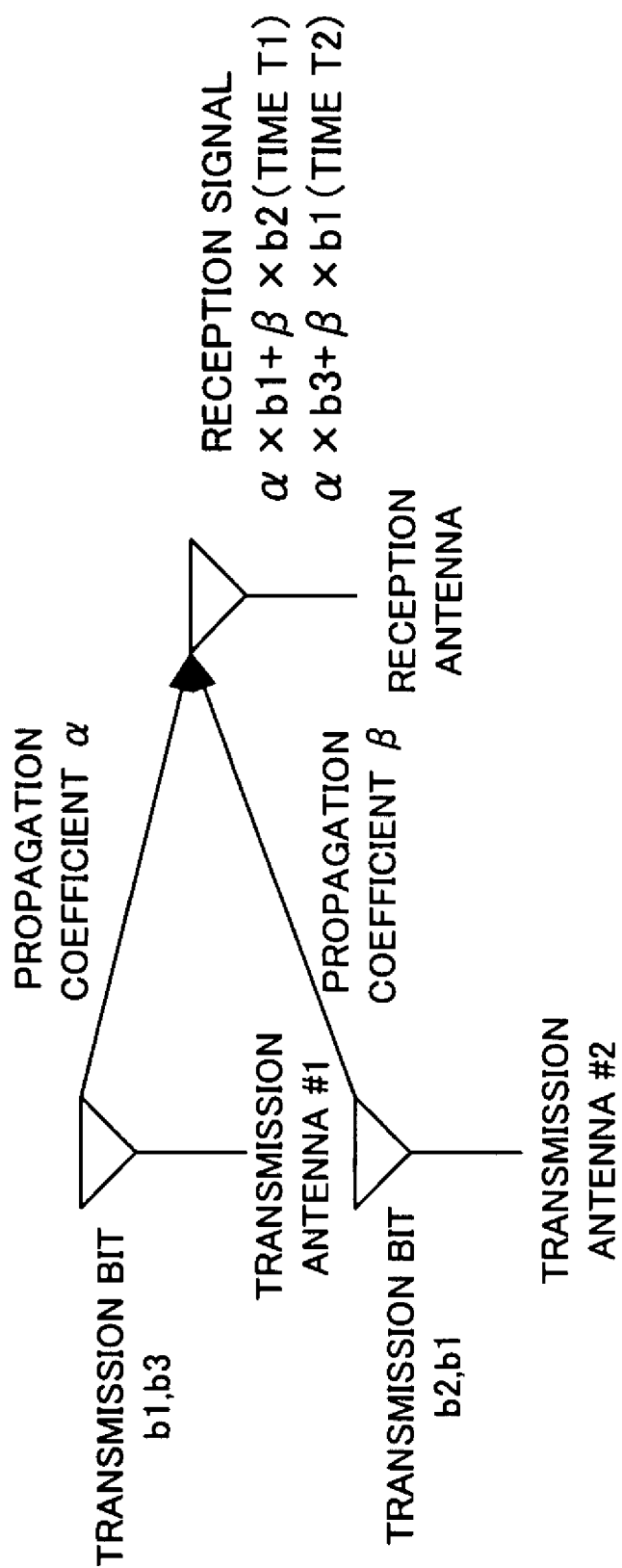
FIG. 16 is a schematic diagram showing propagation coefficients between transmission antennas and reception antennas for describing reception processing of the simultaneous transmission bits of FIG. 15.
Figure 17:
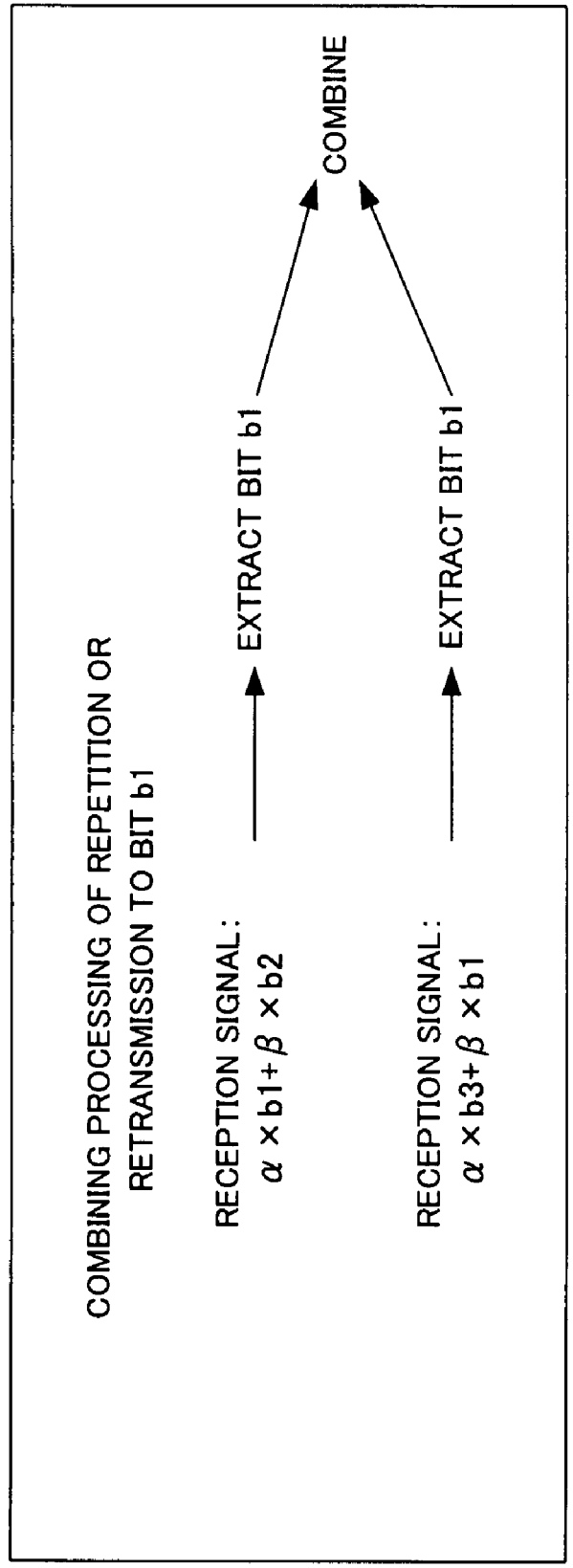
FIG. 17 is a schematic diagram for describing reception processing (combination processing of repetition or retransmission) on the assumption of the propagation coefficients of FIG. 16.
Figure 18:
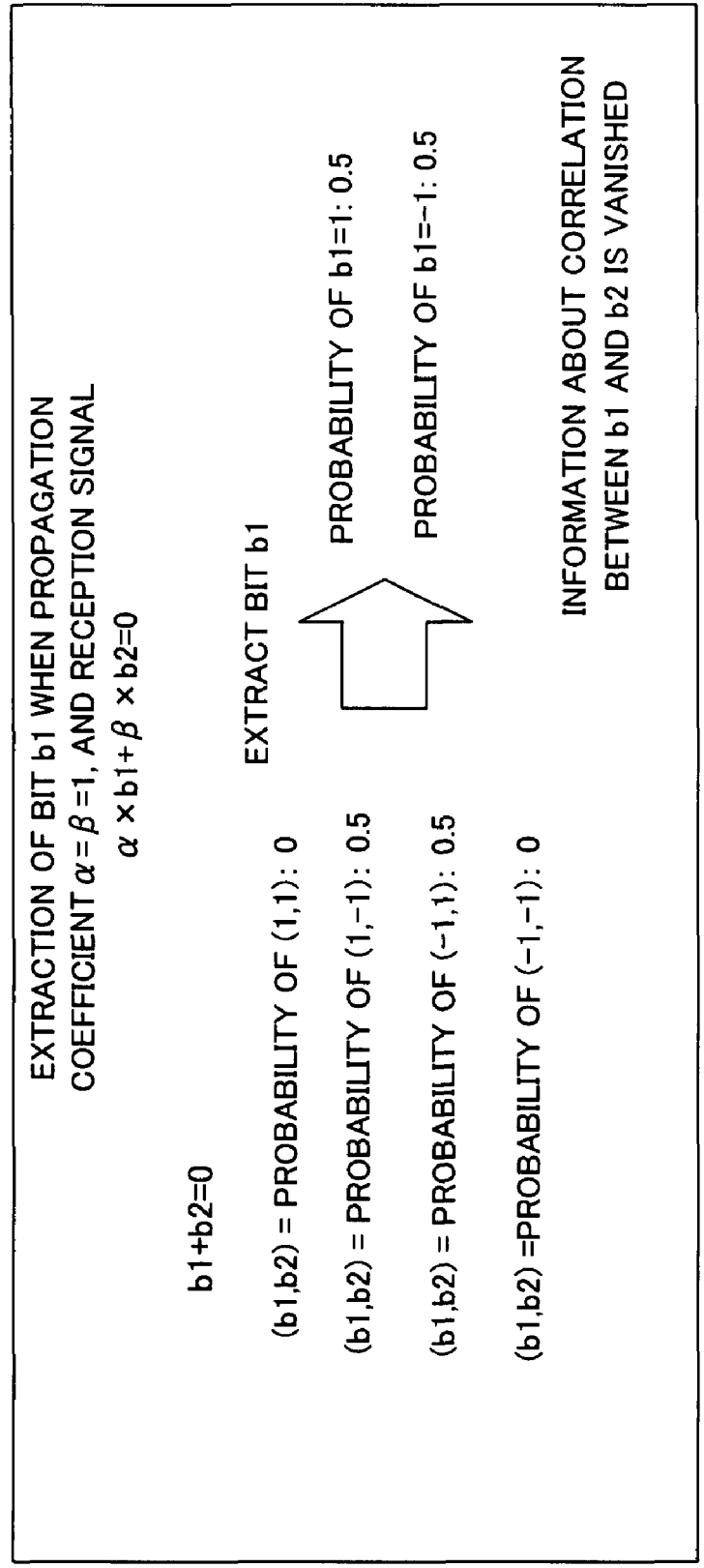
FIG. 18 is a schematic diagram for describing issues in reception processing shown in FIG. 17.

For example, in FIG. 12, throughput characteristics of the MIMO communication method of the above-described embodiment are shown in comparison with those of the previous art. In FIG. 12, the solid line 51 indicates the characteristic when rate matching is performed by the unit of bit according to the previous art; the solid line 52 indicates the characteristic when rate matching is performed by the unit of simultaneous transmission bits and processing (separation and demodulation) is performed by the unit of bit on the receiver end; the solid line 53 indicates the characteristic when rate matching is performed by the unit of simultaneous transmission bits and processing (likelihood combination and demodulation) is also performed by the unit of group. In this instance, the simulation condition is as follows: the number of transmission antennas=2; the number of reception antennas=1 (that is 2×1 MIMO); coding rate is 1/6; the modulation scheme=16QAM; the maximum number of times of retransmission=3; fading one path fdTfrm (the maximum Doppler frequency×1 frame time)=0.16; and the number of bits per frame=650.

As understood by FIG. 12, on the transmitter end, grouping described in item (B1) or item (B2) is performed on the transmitter, and reception processing (likelihood combination and demodulation) described in item (B3) is performed on the receiver (see solid line 53). As a result, the throughput characteristic is improved in comparison with the previous art (see solid line 51) by 20% thorugh 30%.

[C] Description of First Modified Example

When grouping of bits simultaneously transmitted is performed as described in the item (B1) and the item (B2), in the grouping unit 12 or grouping unit 12A, a bit set corresponding to the level of reliability in a symbol of each transmission antenna #j is coped with as a unit.

Figure 9:
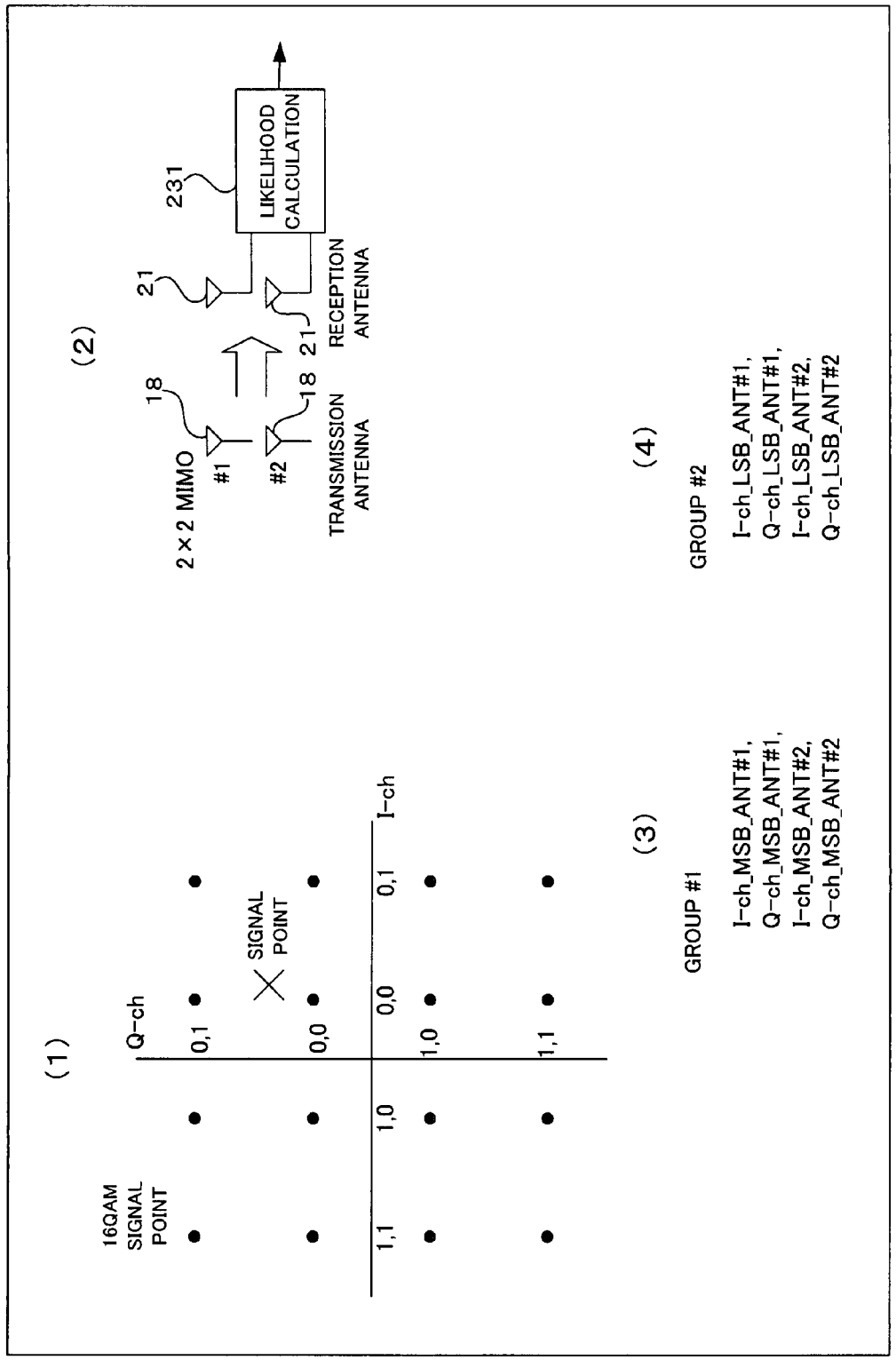
FIG. 9 is a diagram for describing bit grouping performed on the MIMO transmitter according to a first modified example of the present invention.

For example, as shown in FIG. 9(2), when MIMO transmission is performed with two transmission antennas 18 (#1 and #2) by 16QAM (that is, one symbol is transmitted by four bits) and MIMO reception is performed with two reception antennas 21 (that is, 2×2 MIMO communication is performed), as shown in FIG. 9(1), the highest bit (MSB) of the I channel and the Q channel is higher in reliability than the lowest bit (LSB). Thus, as the above grouping, as shown in FIG. 9(3), the group #1 is made to be four bits (I-ch_MSB_ANT#1, Q-ch_MSB_ANT#1, I-ch_MSB_ANT#2, Q-ch_MSB_ANT#2) composed of MSBs of the I Channel and the Q channel. As shown in FIG. 9(4), another group #2 simultaneously transmitted with the group #1 is made to be four bits (I-ch_LSB_ANT#1, Q-ch_LSB_ANT#1, I-ch_LSB_ANT#2, Q-ch_LSB_ANT#2) composed of LSBs of the I Channel and Q channel.

Such grouping makes it possible to perform likelihood calculation individually for the group #1 of MSB and the group #2 of LSB, so that the number of likelihoods to be obtained by the likelihood calculator 231, that is, the operation amount of likelihood calculation, can be reduced, and thus, processing speed is increased.

Figure 10:
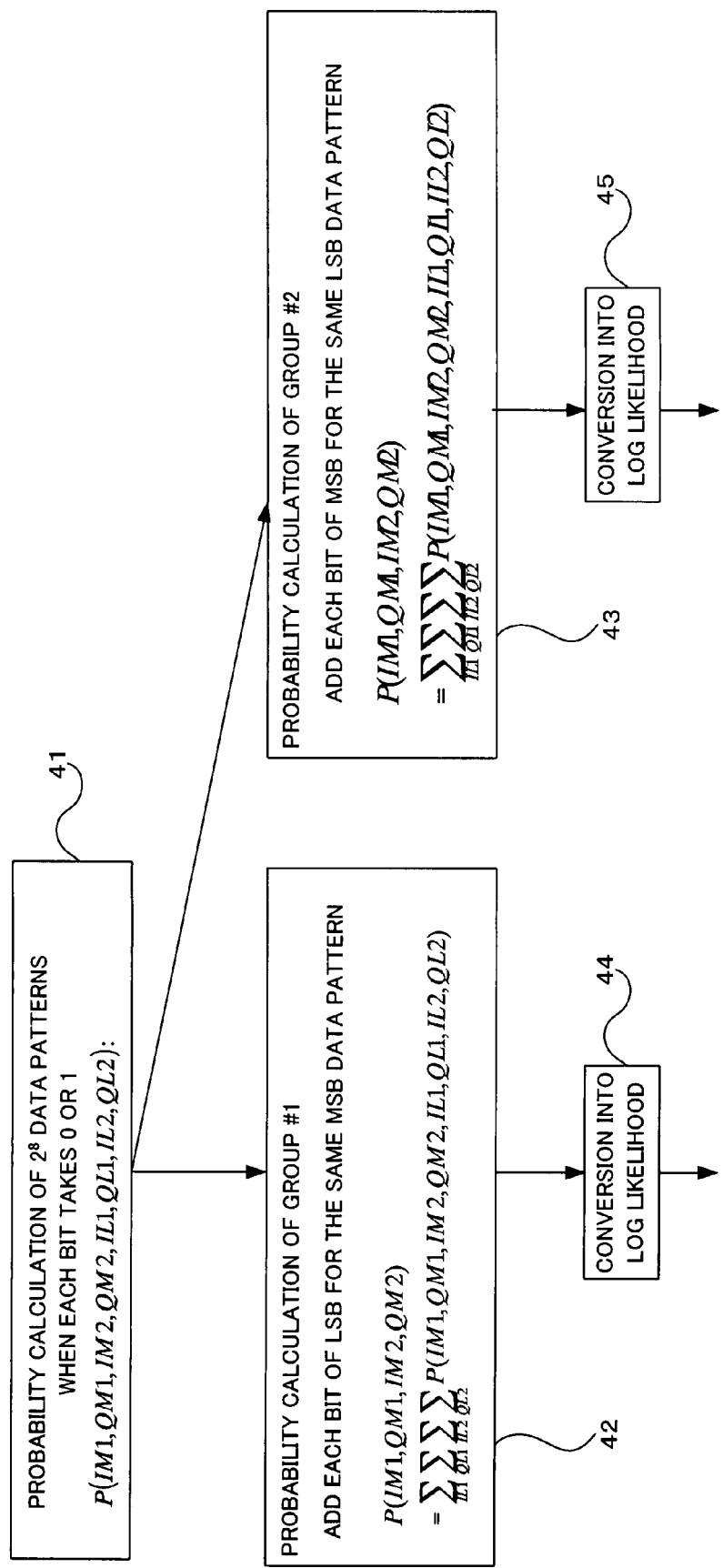
FIG. 10 is a diagram for describing likelihood calculation processing by the MIMO receiver according to the first modified example.

That is, when 2×2 MIMO communication is performed by 16QAM, if the four bits of the group #1 (I-ch_MSB_ANT#1, Q-ch_MSB_ANT#1, I-ch_MSB_ANT#2, Q-ch_MSB_ANT#2) are described as IM1, QM1, IM2, QM2, respectively, and the four bits of the group #2 (I-ch_LSB_ANT#1, Q-ch_LSB_ANT#1, I-ch_LSB_ANT#2, Q-ch_LSB_ANT#2) are described as IL1, QL1, IL2, QL2, the likelihood calculation, as shown in FIG. 10, originally need to calculate a total of 8 bits, that is, the probabilities P (IM1, QM1, IM2, QM2, IL1, QL1, IL2, QL2) of 28(=256) types of data patterns pf in which each bit takes 0 or 1 (see reference character 41).

However, by grouping into the group #1 and the group #2, the probability P (IM1, QM1, IM2, QM2) of the group #1 can be calculated (see reference character 42) by adding individual bits (IL1, QL1, IL2, QL2) with respect to LSB for each of the same data patterns of MSB by the following formula (1). The probability P (IM1, QM1, IM2, QM2) of the group #2 can be calculated (see reference character 43) by adding individual bits (IM1, QM1, IM2, QM2) of MSB for each of the same data patterns of LSB by the following formula (2).

$$P(IM1, QM1, IM2, QM2) = \sum_{IL1}\sum_{QL1}\sum_{IL2}\sum_{QL2} P(IM1, QM1, IM2, QM2, IL1, QL1, IL2, QL2) \quad (1)$$

$$P(IM1, QM1, IM2, QM2) = \sum_{IM1}\sum_{QM1}\sum_{IM2}\sum_{QM2} P(IM1, QM1, IM2, QM2, IL1, QL1, IL2, QL2) \quad (2)$$

In this manner, the likelihood (probability P) calculation is performed individually for the groups #1 and #2 by using bit addition processing, and the obtained likelihoods are converted into logarithm likelihoods (see reference characters 44 and 45 of FIG. 10) and added, so that the operation amount is reduced in comparison with a case in which likelihood is calculated without performing grouping.

[D] Description of Second Modified Example

In the MIMO communication scheme, if situation of a propagation path can be known, it is possible to eliminate correlation among transmission streams by using unique mode. That is, if a propagation matrix H is known, it is possible to perform convert (variable conversion) the propagation matrix H into the diagonal matrix D using unitary matrices U and V by the following formula (3).

$$D = U^{\dagger}HV \quad (3)$$

Accordingly, each transmission stream is converted by the unitary matrix V on the transmitter end beforehand and is transmitted, and is then converted by the conjugate inverse matrix U† of the unitary matrix U on the receiver end. As a result, the diagonal matrix D is obtained, so that correlation among transmission streams can be eliminated (that is, on the receiver end, signal separation of each stream becomes easy).

By utilizing this characteristic, in the grouping unit 12 or 12A, as to a part of transmission streams, correlation is eliminated using a unique mode (variable conversion), and a part or all of the transmission streams not being subjected to the variable conversion can be grouped as described above.

Figure 11:
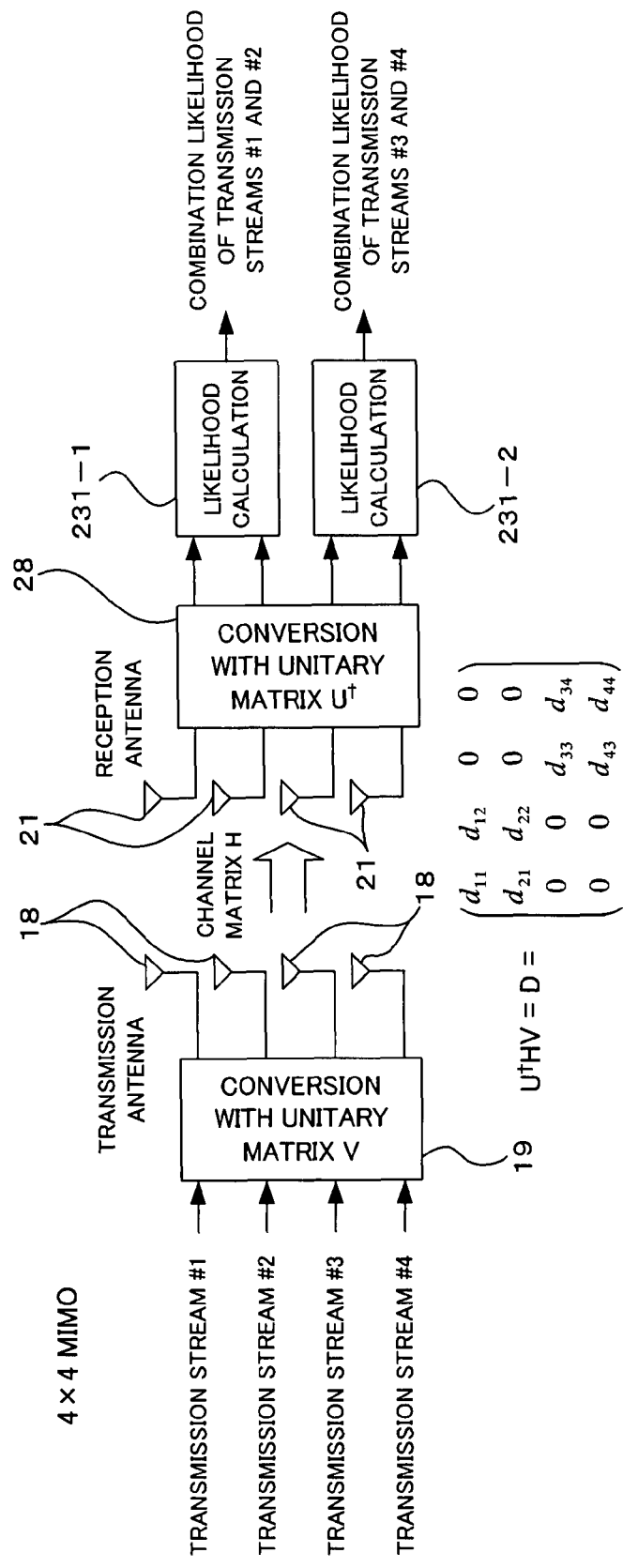
FIG. 11 is a block diagram showing a construction of MIMO communication system (MIMO transmitter and MIMO receiver) according to a second modified example of the present invention.

For example, as shown in FIG. 11, in the case of a system having a MIMO transmitter with four transmission antennas 18 and a MIMO receiver with four reception antennas 21, the transmitter performs transmission after performing unitary conversion by multiplying transmission streams #1, #2, #3, #4 by the unitary matrix V by the transmission-end unitary converter 19, and the receiver multiplies the received signal in which the propagation matrix H is caused by the transmission data propagating on the propagation path by the conjugate inverse matrix U† by the receiver-end unitary converter 28. As a result, correlation between the transmission streams #1 and #2 and the transmission streams #3 and #4 is eliminated.

Hence, on the transmitter (grouping unit 12 or 12A), grouping is performed into a group of transmission streams #1 and #2 and a group of transmission streams #3 and #4 [that is, two transmission symbols, a part of four transmission (multiple value modulation) symbols, are made to be a non-correlation symbol group], and simultaneous transmission is performed at the time of repetition or retransmission, as already described in item (B1) and item (B2), by the unit of the group. The receiver performs reception (likelihood calculation and combination) as described in item (B3). That is, with respected to the group of transmission streams #1 and #2, the likelihood calculator 231-1 calculates likelihood (probability or logarithm likelihood) to obtain the combination likelihood (multiplication or addition), and also, with respect to the group of transmission streams #3 and #4, the likelihood calculator 231-2 calculates likelihood (probability or logarithm likelihood) to obtain the combination likelihood (multiplication or addition).

In this manner, by making transmission streams without correlation using MIMO unique mode, it becomes possible to individually perform likelihood calculation for transmission streams without correlation, so that the operation amount for likelihood calculation is reduced, thus resulting in speeding up of processing.

In this instance, by MIMO unique mode, correlation among all the transmission streams can be completely eliminated, and then bits in the multiple value modulation symbol of each transmission stream can be grouped (grouping by MSB and LSB already described with reference to FIG. 9 and FIG. 10 can also be applied).

As detailed above, according to the present invention, a bit combination (group) simultaneously transmitted is made to be the same as the bit combination having already been transmitted, and reception processing (likelihood combination) is performed on the receiver end by the unit of the group, so that vanishing of correlation information among bits is avoided and deterioration of reception characteristic is prevented.

Thus, the present invention is considered to be significantly useful in the field of radio communication technology.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication system, comprising:
   a transmitter, including
      a plurality of transmission antennas that transmit a transmission data stream grouped by taking a combination of data bits to be transmitted from a part or all of the plurality of transmission antennas at the same time as one group and perform retransmission processing for a grouped bit combination; and
   a receiver, including
      a plurality of reception antennas that receive a signal sent from the transmission antenna of said transmitter; and
      a reception processor that performs retransmission combination processing for each of the groups by combining likelihood calculated with respect to a reception signal received by the reception antennas for each of the groups, wherein
   a combination of data bits retransmitted from a part or all of the plurality of transmission antennas at the same time is the same as a combination of data bits having already been transmitted from a part or all of the plurality of transmission antennas at the same time;
   the combination of data bits retransmitted from a part or all of the plurality of transmission antennas at the same time includes at least one of data bits which are not object of the retransmission; and
   the retransmission combination processing is performed with the product or the sum of logarithm likelihood of the probability of specific combinations of grouped data bits that are the object of the retransmission and grouped data bits that are not the object of the retransmission
   wherein the logarithm likelihood of the probability of the specific combinations of grouped data bits used for combination processing meet optimized value criteria.

2. A communication method for use in a communication system including a transmitter having a plurality of transmission antennas and a receiver having a plurality of reception antennas, said communication method comprising:
   on the transmitter,
      grouping a transmission data stream, taking a combination of data bits to be transmitted from a part or all of the plurality of transmission antennas at the same time as one group; and
      performing retransmission processing for each of the grouped bit combinations, and on the receiver,
      obtaining likelihood with respect to a reception signal received by the reception antennas for each of the groups; and
      performing retransmission combination processing for each of the groups by combining the obtained likelihood, wherein
   a combination of data bits retransmitted from a part or all of the plurality of transmission antennas at the same time is the same as a combination of data bits having already been transmitted from a part or all of the plurality of transmission antennas at the same time;
   the combination of data bits retransmitted from a part or all of the plurality of transmission antennas at the same time includes at least one of data bits which are not object of the retransmission and;
   the retransmission combination processing is performed with the product or the sum of logarithm likelihood of the probability of specific combinations of grouped data bits that are the object of the retransmission and grouped data bits that are not the object of the retransmission
   wherein the logarithm likelihood of the probability of the specific combinations of grouped data bits used for combination processing meet optimized value criteria.

3. A transmitter, comprising:
   a plurality of transmission antennas;
   a processor that groups a transmission data stream, taking a combination of data bits to be transmitted from a part or all of the plurality of transmission antennas at the same time as one group, and that performs retransmission processing for a grouped bit combination, wherein
   a combination of data bits retransmitted from a part or all of the plurality of transmission antennas at the same time is the same as a combination of data bits having already been transmitted from a part or all of the plurality of transmission antennas at the same time;
   the combination of data bits retransmitted from a part or all of the plurality of transmission antennas at the same time includes at least one of data bits which are not object of the retransmission; and
   a retransmission combination processing is performed, by a receiver, with the product or the sum of logarithm likelihood of the probability of specific combinations of grouped data bits that are the object of the retransmission and grouped data bits that are not the object of the retransmission
   wherein the logarithm likelihood of the probability of the specific combinations of grouped data bits used for combination processing meet optimized value criteria.

4. A transmitter as set forth in claim 3, wherein said processor performs the grouping by serial to parallel conversion of the transmission data stream into the number of bits to be transmitted at the same time.

5. A transmitter as set forth in claim 3, wherein said processor performs the grouping with respect to multiple ones of the transmission data stream, the transfer rates of the multiple transmission data streams being individually controlled.

6. A transmitter as set forth in claim 3, wherein said processor groups a bit set corresponding to the level of reliability in a symbol as the group, when the symbol is transmitted by multiple bits of the transmission data stream.

7. A transmitter as set forth in claim 3, wherein said processor groups, when transmission is performed under the situation that correlation among at least a part of multiple transmission data streams is subjected to variable conversion into absence of correlation beforehand, a part or all of the data bits of transmission data streams not being subjected to the variable conversion as the group.

8. A receiver which receives a signal sent from a transmitter that groups a transmission data stream, taking a combination of data bits to be transmitted from a part or all of the plurality of transmission antennas at the same time as one group and performs retransmission processing for each of the thus grouped bit combinations, said receiver comprising:
   a plurality of reception antennas that receives the signal;
   a processor that calculates likelihood with respect to a reception signal received by the reception antennas for each of the groups, and that performs retransmission combination processing for each of the groups by combining calculated likelihood, wherein a combination of data bits retransmitted from a part or all of the plurality of transmission antennas at the same time is the same as a combination of data bits having already been transmitted from a part or all of the plurality of transmission antennas at the same time;

the combination of data bits retransmitted from a part or all of the plurality of transmission antennas at the same time includes at least one of data bits which are not object of the retransmission; and the retransmission combination processing is performed with the product or the sum of logarithm likelihood of the probability of specific combinations of grouped data bits that are the object of the retransmission and grouped data bits that are not the object of the retransmission wherein the logarithm likelihood of the probability of the specific combinations of grouped data bits used for combination processing meet optimized value criteria.

* * * * *